(12) United States Patent
Ojala et al.

(10) Patent No.: US 6,264,793 B1
(45) Date of Patent: Jul. 24, 2001

(54) METHOD AND APPARATUS FOR MEASURING CALIPER OF PAPER

(75) Inventors: Mauri Ojala, Tampere; Hannu Moisio, Kangasala, both of (FI)

(73) Assignee: Metso Paper Automation Oy, Tampere (FI)

( * ) Notice: Subject to any disclaimer, the term of this patent is extended or adjusted under 35 U.S.C. 154(b) by 0 days.

(21) Appl. No.: 09/622,995

(22) PCT Filed: Feb. 25, 1999

(86) PCT No.: PCT/FI99/00150

§ 371 Date: Aug. 25, 2000

§ 102(e) Date: Aug. 25, 2000

(87) PCT Pub. No.: WO99/44015

PCT Pub. Date: Sep. 2, 1999

(30) Foreign Application Priority Data

Feb. 26, 1998  (FI) .......................................... 980445

(51) Int. Cl.[7] .......................... G01B 13/06; G01B 21/08; D21F 11/00
(52) U.S. Cl. ............................ 162/198; 73/37.7; 73/159; 324/229; 702/97; 356/381; 356/375
(58) Field of Search .................................... 162/198, 263, 162/258; 324/229–331; 73/159, 37.7; 702/97, 17.1, 155; 340/675; 356/375, 380–381

(56) References Cited

U.S. PATENT DOCUMENTS

| 3,582,002 | * | 6/1971 | Langstroth et al. ...................... 241/5 |
| 4,031,752 |   | 6/1977 | Sanders . |
| 4,292,838 |   | 10/1981 | Larsen . |
| 4,903,528 | * | 2/1990 | Balakrishnan et al. ................. 73/159 |
| 4,929,895 | * | 5/1990 | Typpo .................................. 324/231 |
| 4,970,895 | * | 11/1990 | Houghton et al. ...................... 73/159 |
| 5,074,050 | * | 12/1991 | Williams ........................... 33/501.03 |
| 5,113,358 | * | 5/1992 | Reber ..................................... 702/171 |
| 5,132,619 |   | 7/1992 | Typpo . |
| 5,575,078 |   | 11/1996 | Moulton, III . |
| 5,770,949 | * | 6/1998 | Sgro .................................... 324/229 |

FOREIGN PATENT DOCUMENTS

| 40 11 646 | 10/1991 | (DE) . |
| WO 95/30877 | 11/1995 | (WO) . |

* cited by examiner

Primary Examiner—Jose Fortuna
(74) Attorney, Agent, or Firm—Alston & Bird LLP

(57) ABSTRACT

The invention relates to a method and apparatus for measuring the caliper of paper substantially continuously during papermaking. A sensor (3a, 3b) is arranged above and/or under the paper (2), the sensor (3a, 3b) measuring the caliper of the paper (2) at least on one side of the paper (2) mainly without contacting the surface of the paper (2). At given intervals the sensor (3a, 3b) measuring mainly without contact is brought into momentary contact with the surface of the paper (2).

4 Claims, 1 Drawing Sheet

METHOD AND APPARATUS FOR MEASURING CALIPER OF PAPER

FIELD OF THE INVENTION

The invention relates to a method of measuring the caliper of paper, the method comprising measuring the caliper of paper substantially continuously during papermaking by a sensor being arranged above and/or under the paper, the sensor measuring the caliper of the paper at least on one side of the paper mainly without contacting the surface of the paper.

The invention also relates to an apparatus for measuring the caliper of paper, the apparatus comprising means above and/or below the paper for measuring the caliper of the paper substantially continuously during papermaking by a sensor being arranged on at least one side of the paper to measure the caliper of the paper mainly without contacting the surface of the paper.

BACKGROUND OF THE INVENTION

In a paper machine, the caliper and other properties of paper and paperboard are typically continuously monitored as the paper is moving. Gauges are usually fastened to what is known as a measuring beam, in which the gauges continuously move in a reciprocating manner in the transverse direction of the paper and continuously measure the paper as it moves forward. Sensors are arranged as close to the surface of the paper as possible to improve measuring accuracy. This causes a plurality of problems, e.g. if the measuring sensors for some reason come into contact with the surface of the paper, the sensors may leave tracks on the paper. Furthermore, the contact may cause fouling of measuring heads, resulting in impaired measuring accuracy in the long run. Sensors contacting the irregularities of the surface of the paper may also cause holes to be formed in the paper. Consequently it is known to use what is known as an air bearing, the sensors being provided with a bored hole or holes through which air is blown in between the sensor and the paper web. Owing to the air bearing, the sensor is able to stay clear of the web, and hence e.g. the irregularities on the surface of the paper do not come into contact with the measuring head. This avoids formation of holes in the paper. Formation of traces on the surface of the paper is also avoided and fouling of the sensors diminishes. Such an air bearing solution is disclosed in e.g. German Offenlegungsschrift 40 11 646 and in WO 95/30877. However, in an air bearing, the thickness of the air layer between the paper and the sensor is about 50 micrometers. When both sides of the paper comprise sensors which are subjected to an air bearing, the total thickness of the air layer is about 100 micrometers. The thickness of the air layer is considerable with respect to the desired measuring accuracy, which is about 1 micrometers. The effect of a thick air layer on the measuring results is usually compensated for by mathematical proceedings. A sample is taken from each produced paper roll and its caliper is analyzed at a laboratory, whereby the effect of the air layer can be determined. However, this is a dissatisfactory manner since it only reveals a momentary actual caliper of the paper. Furthermore, during the time the sample is being analyzed at the laboratory, and before the result is ready, a large quantity of paper has been produced, the caliper of which can no longer be influenced. Hence this is not a flexible manner to adjust the caliper of a web.

U.S. Pat. No. 5,132,619 discloses an apparatus for measuring the caliper of paper, wherein an air bearing is used to keep the apparatus out of contact with the paper to be measured. The sensor, in turn, is arranged to move against the paper by pressurized air. Consequently, the sensor leaves a mark in papers of a more sensitive quality in particular. The sensor also very easily gets fouled. Furthermore, the structure of the equipment is complex and laborious.

It is the object of the present invention to provide a method and an apparatus which avoid the above drawbacks.

SUMMARY OF THE INVENTION

The method of the invention is characterized by bringing the sensor measuring mainly without contact at given intervals into momentary contact with the surface of the paper.

The apparatus of the invention is characterized by comprising a control unit for controlling the sensor measuring mainly without contact to momentarily contact the surface of the paper.

It is an essential idea of the invention to measure the caliper of paper by a sensor mainly without the sensor contacting the paper, but bringing the sensor at given intervals into momentary contact with the paper. The sensor is preferably brought into contact with the paper at the edge of the paper web.

It is an advantage of the invention that occasional removal of the non-contacting feature allows accurate measurement of the caliper of paper at given intervals and thereby accurate determination of the effect of the thickness of the air layer on the measurement. The measuring result is also immediately available, whereby the whole run can be controlled when required and the caliper of the paper can be changed during the run. Contact of the sensor with the paper can be arranged to take place at the edge of the paper web, where the sensors stop anyhow in order to change moving directions. In this case the sensors do not have to be separately stopped for the measurement.

In addition to paper, the term paper refers in this context also to paperboard.

BRIEF DESCRIPTION OF THE FIGURES

The invention will be described in greater detail in the attached drawing, in which.

DETAILED DESCRIPTION OF THE PREFERRED EMBODIMENTS

Figure 1:
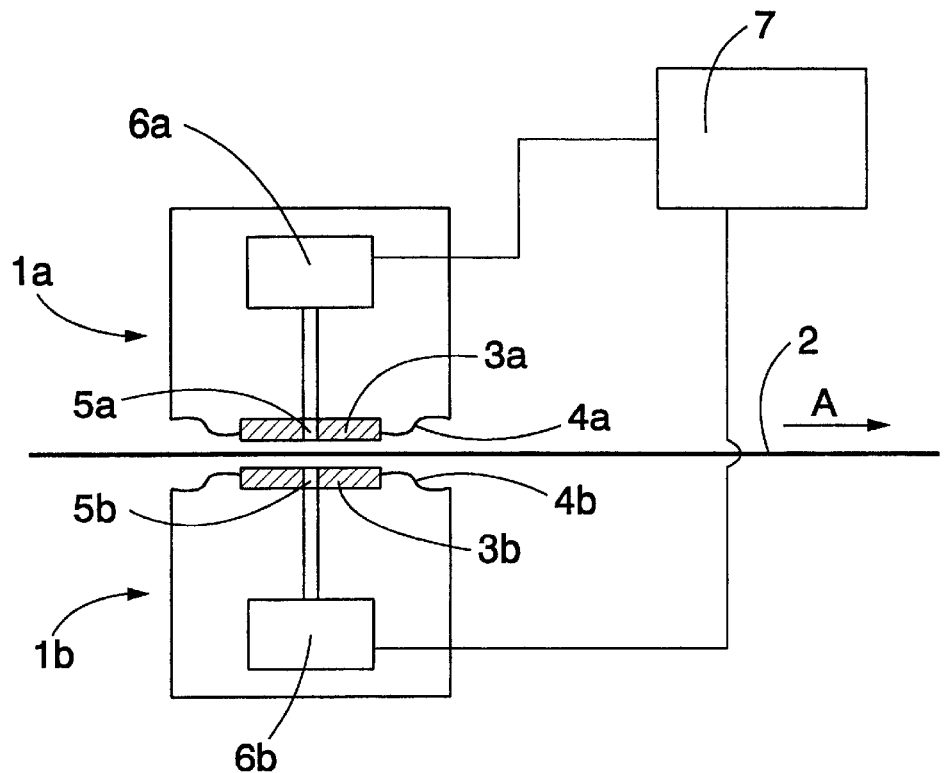
FIG. 1 is a partially sectional side view of the apparatus of the invention.
Figure 2:
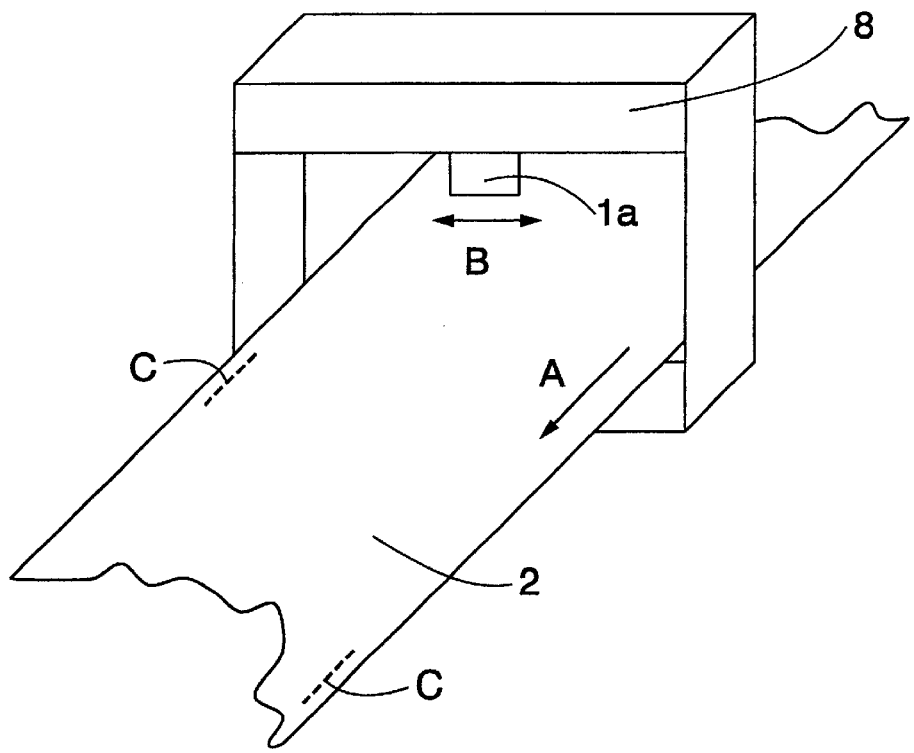
FIG. 2 is a schematic axonometric view of the apparatus of the invention.

The apparatus comprises a first measuring head 1a and a second measuring head 1b, the paper 2 being arranged between them. The paper moves in the machine direction in accordance with arrow A. The first measuring head 1a and the second measuring head 1b are arranged in what is called a measuring beam 8, as shown in FIG. 2, in which the measuring heads 1a and 1b traverse substantially continuously in a direction transverse to the machine direction. The caliper of the paper is measured substantially the whole time the paper moves forward. For the sake of clarity the measuring head 1a and a second sensor 3b is arranged in the measuring head 1b. The first sensor 3a may be e.g. a coil and the second sensor 3b e.g. tablet made from a suitable material, whereby the distance between the sensors 3a and 3b can be determined by the measuring apparatus in a manneer known per se. The sensors in the sensors 3a and 3b can have any structure known per se, so as to allow determination of the distance between them. Different sensors and the use thereof in measuring the caliper are obvious to persons skilled in the art, and are therefore not dealt with in any greater detail herein or in the attached figures.

The first sensor 3a is fastened to the first measuring head 1a by a flexible membrane 4a, the second sensor 3b is similarly fastened to the second measuring head 1b by a flexible membrane 4b. The flexible membranes 4a and 4b allow the sensors 3a and 3b to move towards one another or away from one another as e.g. the caliper of the paper 2 varies.

In the middle of the first sensor 3a is arranged a nozzle 5a via which air is blown by a fan 6a. In the middle of the second sensor 3b is similarly arranged a nozzle 5b via which air is blown by a fan 6b. Blowing air through the nozzles 5a and 5b keeps the sensors 3a and 3b at a given distance from the paper web 2. This way the sensors 3a and 3b do not leave any marks in the paper, and e.g. irregularities on the surface of the paper 2 do not come into contact with the gauges, avoiding hole formation in the paper 2. The sensors 3a and 3b also remain relatively clean. There may naturally be more than one nozzle per sensor.

The apparatus further comprises a control unit for controlling the fans 6a and 6b. The control unit 7 serves to switch off the fan, whereby no air is blown through the nozzles. In this case the sensors 3a and 3b come into contact with the paper 2, allowing accurate measurement of the caliper of the paper 2 and calibration of the effect of the air layer on the measuring result.

Most preferably the sensors 3a and 3b are brought into contact with the surface of the paper 2 at the edge of the paper web. If holes are formed in the paper during the contact, a winder can be used to cut off part of the edges of a finished paper roll before delivery to a customer, and hence the mark possibly created in the paper during the contact does not impair the finished product.

The time it takes for the measurement to settle into a state of equilibrium determines the duration of contact of the paper and the sensor. In practice the contact takes less than 30 seconds, a typical duration of the contact being a few seconds. At its shortest the interval between the moments of contact can be e.g. the time it takes for the sensor to travel from one edge of the paper web to the other, which in practice is some dozens of seconds. In the context of the present application, the definition that a sensor measures in a mainly non-contacting manner means that the duration of a non-contacting measurement is longer than the duration of the contact between a sensor and the paper. If there is no change in the paper grade and its caliper properties typically remain quite well in their correct values, the procedure could be e.g. such that at the start of the manufacture of a given paper grade the caliper is measured by contacting the paper and thereafter the caliper is measured in a non-contacting manner until e.g. a full roll of paper is finished, which could take e.g. about an hour. Test runs can naturally determine the frequency of contacting measurements.

FIG. 2 shows a measuring beam 8. The first measuring head 1a traverses substantially continuously in a direction transverse to the machine direction, the motion being shown by arrow B. The dashed line C denotes points of contact of the sensors 3a and 3b with the surface of the paper 2 at the edge of the paper web.

The drawings and the related description are intended only to illustrate the inventive idea. The details of the invention may vary within the scope of the claims.

What is claimed is:

1. A method of measuring the caliper of paper, the method comprising:

measuring the caliper of the paper substantially continuously during papermaking with at least one sensor being arranged adjacent a surface of the paper;

maintaining the sensor at a position removed from the paper surface so as to measure the caliper of the paper mainly without contacting the surface of the paper; and, at given intervals, contacting the sensor with the surface of the paper.

2. A method as claimed in claim 1 wherein said measuring step further comprises measuring the caliper of the paper on both sides thereof with at least one sensor on each side of the paper mainly without contacting the respective surface of the paper, and wherein said sensor contacting step further comprises contacting at least one sensor on each side of the paper with the surface of the paper.

3. A method as claimed in claim 1 wherein said sensor contacting step occurs at an edge of the paper.

4. A method as claimed in claim 1 wherein said step of maintaining the sensor at a position removed from the paper surface is accomplished by blowing air in between the sensor and the paper, and further wherein said sensor contacting step is accomplished by discontinuing said air blowing.

* * * * *